United States Patent
Santos et al.

(10) Patent No.: US 9,591,173 B2
(45) Date of Patent: Mar. 7, 2017

(54) SYSTEM AND METHOD FOR DIGITAL ANALYSIS OF AUTHENTICITY AND INTEGRITY OF DOCUMENTS USING PORTABLE DEVICES

(75) Inventors: Eduardo Telmo Fonseca Santos, Salvador-Ba (BR); Eduardo Manuel De Freitas Jorge, Salvador-Ba (BR); Ana Lucia Lage Pereira, Salvador-Ba (BR); Gustavo De Almeida Neves, Salvador-Ba (BR); Geovane Dos Santos Anunciacao, Salvador-Ba (FR); Nilton Vasquez Carvalho Junior, Salvador-Ba (BR)

(73) Assignee: SAMSUNG ELECTRÔNICA DA AMAZÔNIA LTDA., Campinas-São Paulo (BR)

(*) Notice: Subject to any disclaimer, the term of this patent is extended or adjusted under 35 U.S.C. 154(b) by 479 days.

(21) Appl. No.: 13/339,014

(22) Filed: Aug. 17, 2012

(65) Prior Publication Data
US 2014/0049802 A1    Feb. 20, 2014

(51) Int. Cl.
*H04N 1/32* (2006.01)
*H04N 1/00* (2006.01)

(52) U.S. Cl.
CPC ....... *H04N 1/32144* (2013.01); *H04N 1/0087* (2013.01); *H04N 1/00846* (2013.01); *H04N 2201/3235* (2013.01); *H04N 2201/3238* (2013.01); *H04N 2201/3249* (2013.01)

(58) Field of Classification Search
CPC ............................... G06F 17/30265
See application file for complete search history.

(56) References Cited

U.S. PATENT DOCUMENTS

| | | | |
|---|---|---|---|
| 2005/0052695 A1* | 3/2005 | Fukunaga et al. | 358/1.15 |
| 2005/0168769 A1* | 8/2005 | Kim et al. | 358/1.14 |
| 2006/0041562 A1* | 2/2006 | Paczkowski | G06F 17/30884 |
| 2006/0106793 A1* | 5/2006 | Liang | 707/5 |
| 2010/0202020 A1* | 8/2010 | Kato | G06F 21/608 |
| | | | 358/1.15 |

OTHER PUBLICATIONS

"Nested image steganography scheme using QRbarcode technique", Published May 6, 2009, by Wen-Yuan Chen ; Jing-Wein Wang, whole document.*

* cited by examiner

*Primary Examiner* — Mohammad Ghayour
*Assistant Examiner* — Lennin Rodriguezgonzalez
(74) *Attorney, Agent, or Firm* — Staas & Halsey LLP

(57) ABSTRACT

The present invention relates to a protection system for printed documents using steganographic and computer vision, materialized by the use of portable devices, where ETCODE encoded images are generated for this purpose. This method was created in order to ensure the document's authenticity, integrity of information, store information about authorship and copyright protection of printed documents. The protection method described in this patent is to generate an encoded image ETCODE using steganographic techniques, to be printed with the document, using conventional printers, and also that the decoding is performed by a digital camera portable device, obtaining therefore the information hidden in ETCODE, and then confronted with the information about the document in its digital version present in a database, thus fulfilling the proposal document protection.

17 Claims, 18 Drawing Sheets

SYSTEM AND METHOD FOR DIGITAL ANALYSIS OF AUTHENTICITY AND INTEGRITY OF DOCUMENTS USING PORTABLE DEVICES

FIELD OF THE INVENTION

The present invention relates to the field of human interaction with mobile devices, in particular the interaction made using computer vision to the decoding of information extracted from captured images (ETCODE) of printed documents through the integrated camera on portable devices, in particular, mobile phones, smartphones, Personal Digital Assistants (PDAs), digital cameras, laptops, among others.

The encoded pictures ETCODE are generated in order to graphically represent a CRC32 code using steganography techniques to hide information from the same. Each document or page containing ETCODE is stored in a database that associates the CRC32 of the same to the digital version of the document or page to search further. Thus, by extracting a CRC32 ETCODE printed on a page, it is possible to compare the document printed with their respective digital version stored, thereby enabling to perform validation documents.

The term ETCODE (Entropy Tag Code), as used herein, refers to the name given to the protection system of documents using steganography techniques and computer vision. The term CRC32 relates to a specific polynomial used in the CRC code that enables the cyclic redundancy check and establishing an error detector code. As the CRC takes into account all the bits to generate the code, even small changes can be detected.

PRIOR ART

Steganography is the art of hidden writing. And a very important technique for protection of information being used over time by many civilizations.

With the advancement of technology, a new strand of steganography arose, called digital steganography, which added new mechanisms for the area of information security. These new technologies basically consist of inserting a file-message into a host-file.

For this purpose, various techniques are used. Among the techniques of digital steganography, an algorithm that is widely used is the LSB [1] (Least Significant Bit) that uses an image as information hiding. This information is stored in the least significant bits of the host image and as a result, there is apparently an image equal to the initial image. However, as the size of the information to be hidden increases, the image quality decreases, because it may be necessary to use other more significant bits. This algorithm can be used on each byte of a 32-bit image.

The steganography can also be implemented via algorithms and transformations. To this can be used in Z transform, Fourier transform and discrete cosine transform. The latter method is more sophisticated than the other two cited above, since the information to be hidden is inserted into the transformation domain.

The spread spectrum technique is to break the data to be hidden and spread them on the host image. Steganography in videos is done in a way similar to steganography in images, the difference is that the data is hidden into the video frames. The quality of the resulting video is inversely proportional to the hidden information, ie, increasing the amount of hidden data drastically reduces the quality and hence the quality of host video.

The patent document PI 0906398-6, entitled "IMPROVEMENT IN STEGANOGRAPHY AND THE MEANS TO ITS GENERATION AND AUTOMATED READING", published on Aug. 23, 2011, describes a device for reading the image reading in steganography. A picture in black and white is hidden in another image so that a lens or a specific software can make this image visible to the human eye. In this case, the hidden image may be displayed if specified conditions for positioning the lens are met and there is no mechanism to validate whether the displayed image corresponds closely to the image that was hidden.

The present invention provides a different solution for decoding without the need for development of a specific device (lens), because decoding can be performed via software by a mobile device that has camera and processing unit and it is still possible that originality of the encoded information is validated.

The patent document PI 0800033-6, entitled: "REPRESSION OF FAKE MARKS USING SAFETY IN DISPERSED MINIATURE", published on Sep. 16, 2008, presents a method for detecting patterns of security features that are inserted into documents and images in format of thumbnails. Thumbnail images are placed in a dispersed manner in the document, following a template scattering. The validation of the document occurs by checking the correspondence between the points found scattered in a pre-defined template. Unlike in the present invention, the hidden information occupies a specific area of the document and the validation takes place by decoding the hidden information that is to be compared with a key generated from the document to be protected.

The patent document PI 0710850-8, entitled "METHOD AND DEVICE FOR PROTECTION AND CONTROL OF PRODUCT ORIGINALITY AND ITS ELECTRONIC READING CERTIFICATE", published on May 24, 2011, exposes a method used for protection and control of the originality of products and its electronic reading certificate consisting of applying a bonding layer on the product, which restorable markings are made, using a subsequent control beam. Decoding is performed by scanning the area where the marking is applied. Then, the information from the decoding of restorable marks is compared to information from the original mark. Differently, in the present invention, the marking mechanism is used to print an image with the original document, and the decoded information is compared with information that was hidden and, if the document is not original, the decoded information will differ from the initial information. In addition, in the document PI 0710850-8, the information of the original markings are stored in a database along with the electronic reading certificate, while, according to the present invention, the original data, generated from the original document can be sent via email or SMS to the receiver of the document so that the validation can be effected.

The patent document PI 0604029-2, entitled "PROCESS FOR GENERATING, PRINTING AND READING OF AN UNKNOWN IMAGE for AUTHENTICATION OF DOCUMENTS AND SUBSTRATE PRINTED WITH FIXED OR VARIABLE UNKNOWN DATA", published on Apr. 22, 2008, proposes a printing process where a hidden image, the dispersion of its pixels is inserted into the printed document. This image can only be read by a decoder made by a printing process or by special graphic software specific know the frequency with which the unknown image was generated. The hidden image needs another image that serves as a host, so this process is not recommended for document consisting only of text. Differently, the present invention provides a general solution in which a noisy image is generated based on the original, not requiring a host image. Furthermore, according to the teachings of document PI 0604029-2, a decoding lens is required by which the hidden information can be recovered, whereas in the present invention, the hidden information can be decoded using a device that has camera and processing unit.

The patent document PI 0105707-3, entitled "METHOD FOR OBTAINING PRINTED MATERIAL WITH HIDDEN INFORMATION, HIDDEN INFORMATION WITH PRINTED MATERIAL AND DEVICE AND METHOD OF ACCESS TO HIDDEN INFORMATION", published on Jun. 24, 2003, describes a method for obtaining printed material with hidden information. It consists of merging the image to be hidden with a host image so that the hidden image is visible only by positioning a specific lens to the image. In the present invention, the validation takes place by comparing the decoded information to information that was hidden in the image. If information is not coincidental, there is an indication that the document in question cannot be the original.

Despite technological advances, mobile devices still have hardware with relatively limited resources to execute algorithms that perform advanced calculations. Therefore, the present invention applied image processing techniques in order to reduce the computational cost, allowing a reduction in the time of image processing and minimizing the use of processor of the portable device, besides saving memory, thus optimizing the use of resources increasing the efficiency of the invention.

The conventional process of document validation can require more time and resources than the one proposed by the present invention, for example, the use of lenticular images which require the use of lenses for validating or the use of holographic seals which require the use of materials and techniques. The present invention proposes the use of conventional printers and handheld devices to conventional coding and decoding of the proposed code (ETCODE), to provide validation of integrity, authenticity and authorship. Furthermore, the conventional process may require change of the status and/or meta information about the document, which is very simple and fast in a computer system. Thus, the use of portable devices enables to save time and resources in the process of document validation.

The images obtained from digital capture of documents are easily stored and transmitted as are already in digital form, which facilitates the diffusion and integration with other systems. Therefore, the validation of documents using ETCODE eliminates an intermediate stage of reproduction and archiving physical copies of the original document for validation purposes later.

SUMMARY OF THE INVENTION

The present invention describes a system for protection of printed documents using steganography and computer vision, embodied by an integrated solution of hardware and software to generate images (ETCODE), containing information hidden by steganography to protect documents, which can be subsequently decoded by means of portable devices that have digital camera. The proposed system enables to perform validation of integrity, authorship and protection against unauthorized copying. Thus, this invention aims to provide a low-cost, efficient and effective, which enables users to realize the protection of printed documents.

The main motivation for the development found in this invention was found by the need to protect users against amendments printed documents and/or unauthorized copies. Typically, a user would use other less practical document protection, such as seals or holographic lenticular images. With the system developed as an embodiment of the process described herein, this process becomes more practical, effective and efficient, serving as a direct print information printed on the document protection.

To realize the protection of printed documents, a coded image was created that enables verification of integrity, authorship and copyright protection. This encoded image was called ETCODE, which is an encoded representation of a 2D bar code, with pseudo-random appearance obtained with steganographic techniques.

We use computer vision techniques to extract information in a coded image representing the ETCODE generated previously. The ETCODE has a graphical representation of coded 32-bit, to enable a signature store CRC32 connected to a printed document or part thereof. Each page of a document can contain an image ETCODE, which can be stored in a database with information about the pages and their respective CRC32. Thus, after extraction of the CRC32 ETCODE of a page, it can be confronted with their digital data base in order to validate its integrity and authorship.

The decoding system embodied in the present invention is designed to run on a portable device, obtained by improving the efficiency of methods and algorithms for the adjustment of the constraints of storage space and computing power of portable devices. Seeking to make the system efficient and easy to use, we used an interface that the user uses a scope to frame the image printed ETCODE.

BRIEF DESCRIPTION OF THE FIGURES

The objects and advantages of the present invention will become more apparent from the following detailed description of an exemplary embodiment of the invention and the accompanying drawings by way of non-limitative example, wherein.

DESCRIPTION OF PREFERRED EMBODIMENTS OF THE INVENTION

Figure 1:
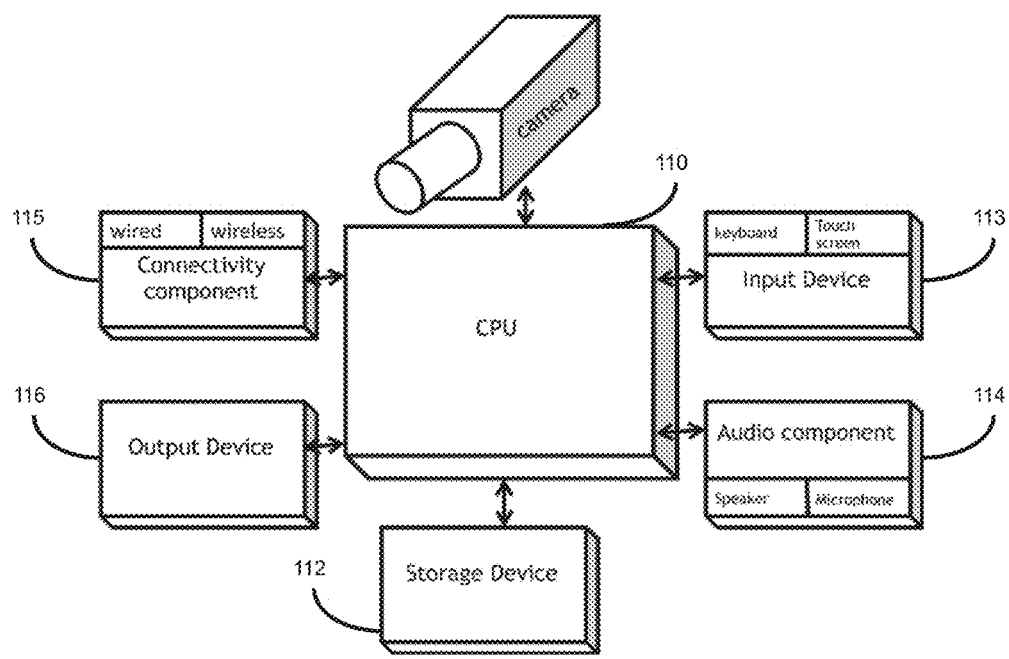
FIG. 1 shows a generic model of the computer system used by the system in which the present invention can be implemented.
Figure 2:
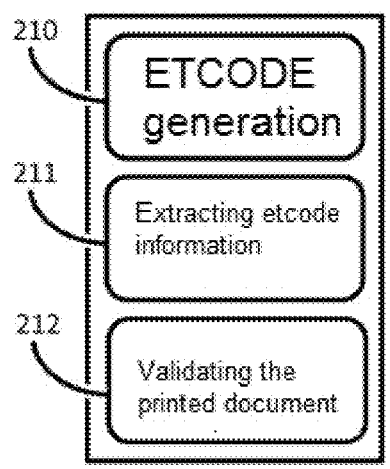
FIG. 2 shows the flow of the macro process of protection of printed documents.

The system of the present invention performs the protection of printed documents using images with information hidden by steganography. These images, called ETCODE, are printed with the document and store information that ensures document protection against unauthorized copying. Then, one can perform the decoding of the image (ETCODE) from portable devices with digital camera and get the information hidden in the same. With this, it became possible to develop a process that performs the validation of integrity, authorship and protection against unauthorized copying of printed documents. Thus, it is obtained as a preferred embodiment of the invention a method and process that information hidden in digital images by means of steganography, performs the extraction of hidden information from mobile devices with digital cameras, and performs the validation of integrity and authorship of printed documents protecting them against unauthorized copying.

The process of the present invention also makes it accessible and simple procedure for validation of documents, both for professionals and lay people, assisting in the confrontation of the printed document with its original digital version. Thus, the proposed process allows to combine ease of use, versatility, flexibility, saving time and resources, simple storage and transmission, as an alternative or additional advantage over the conventional process of validation of documents.

Technical/Functional Advantages of the Invention

Versatility and flexibility: The use of computer vision methods applied to the validation of documents using ETCODE enables you to perform various operations with the decoded information, such as the validation of authorship, integrity and protection against unauthorized copying. The information in ETCODE encoding and retrieval of information from the database of documents enables changes in meta information in the form of processing and the resulting features, characterizing the same as a versatile and flexible system. Thus, it becomes possible to perform several validations on the portable device, reducing effort, cost and time spent in this process.

Low computational cost, seeking to reduce the processing time, programming practices were used to optimize the performance of computer instructions, for example, using fixed point instead of floating point, using bit manipulation to perform some operations, using the minimum instruction possible to scan or copy the pixels of an image, among others.

Reduction of costs and time: The process of the present invention reduces the cost required for validating documents, because the portable devices with computational analysis do not require additional costs for validating documents, such as the purchase of stamps or the use of holographic lenses special decoding lenticular images. The validations of printed documents are also much faster with automatic decoding ETCODE and the automatic search of the digital version of the document in the database.

Intuitive Interface: The interface presents a framework for targeting the ETCODE, enabling the capture of the same and its decoding being very intuitive to the user of the conventional process of document validation. Besides, the automation of the validation and recovery of the digital version of the document brings significant advantages over the conventional process.

Ease of storage and dissemination: The results of scanning documents or pages thereof may be easily stored in a database and transmitted documents, since they are already in digital form, indexed for search for ETCODE. This facilitates the dissemination of information from the database of documents, and meta ETCODE associated codes. Add to that the possibility of creating a history of previous validations performed because the results can be easily stored.

Automatic detection of the region: The process of the present invention performs the automatic ETCODE within the region of the sight. This detection can be used to delimit the regions relevant to the decoding, thus optimizing the performance of computer vision algorithms to extract information from ETCODE.

Space saving and portability: The ability to store numerous documents and ETCODES in a database to validate documents remotely using only a portable device and a server, equivalent to a set of paper documents that occupy space and have a transport less practical. Thus, we obtain a validation process documents that saves space and is easier to transport than the equivalent material in the conventional process.

The system of the present invention is executed in a computer system with the features illustrated in FIG. 1. The Central Processing Unit or CPU (110) is used to execute the instructions necessary for encoding and decoding information hidden in the image of ETCODE. The digital camera is used to capture the image of ETCODE. The storage medium (112) stores information, such as letters and images of documents associated with ETCODE. The computer system also comprises input devices information (113), intercepting keyboard events, the touch screen or mouse. The system also has audio components (114), responsible for capturing and playing sounds. The connectivity component (115) allows the user to connect to a remote database that has the information between the ETCODE and its corresponding document. The display means (116) is responsible for displaying the image information and perform the ETCODE of captured frames shot by digital camera.

To protect the document, it is necessary to generate an image corresponding to the document ETCODE, then capture the image of this ETCODE present in hardcopy of the document, and perform the final validation of the same. Therefore, it became possible to divide the process into three basic steps: "Generation ETCODE" (210), "Extraction of information ETCODE" (211) and "Validation of the printed document" (212).

Generation of ETCODE (210):

The step of "Generation ETCODE" (210) is responsible for generating the image of ETCODE associated with the document. From the steganography, it generates an image which stores a code type CRC32. This code is used to identify the document or portions of the same (isolated pages of the document). The document and respective CRC32 are stored in a database, which enables the document or portion thereof generated from the CRC32.

Figure 3:
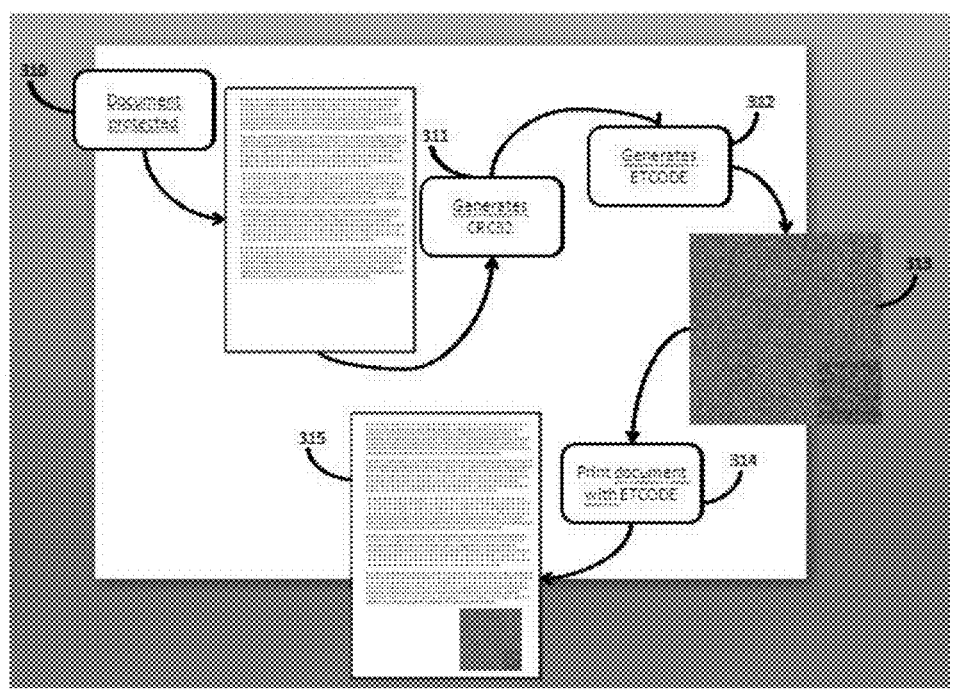
FIG. 3 illustrates the process performed in the generation of the ETCODE image.

The process of creating the image of ETCODE and printing of the document are shown in FIG. 3. The protected document (310) is a digital file of the document, in which you want to create the image of ETCODE. Then, from this file, thereby generating a CRC32 code (311), which is used to identify this document.

The code CRC32 (Cyclic Redundancy Check—cyclic redundancy check) is a technique of error detection able to generate a checksum of huge amounts of bits. The CRC32 deals with data as a large binary number and divide it by another fixed binary number. The rest of this division corresponds to the checksum. This operation is performed based on the arithmetic of binary numbers without transport, reducing the complexity in the calculation of CRC32. The CRC32 has the advantage of using the bits of the entire document, so that a minimal change of the document to generate a new code CRC32. The CRC32 has 32 bits, which are encoded in the image of ETCODE. The use of the CRC32 permits to generate 4294967296 different numbers, making it possible to identify a wide variety of different documents or parts thereof. Due to these characteristics, we used the CRC32 algorithm to generate the image ETCODE identifying the documents.

Figure 4:
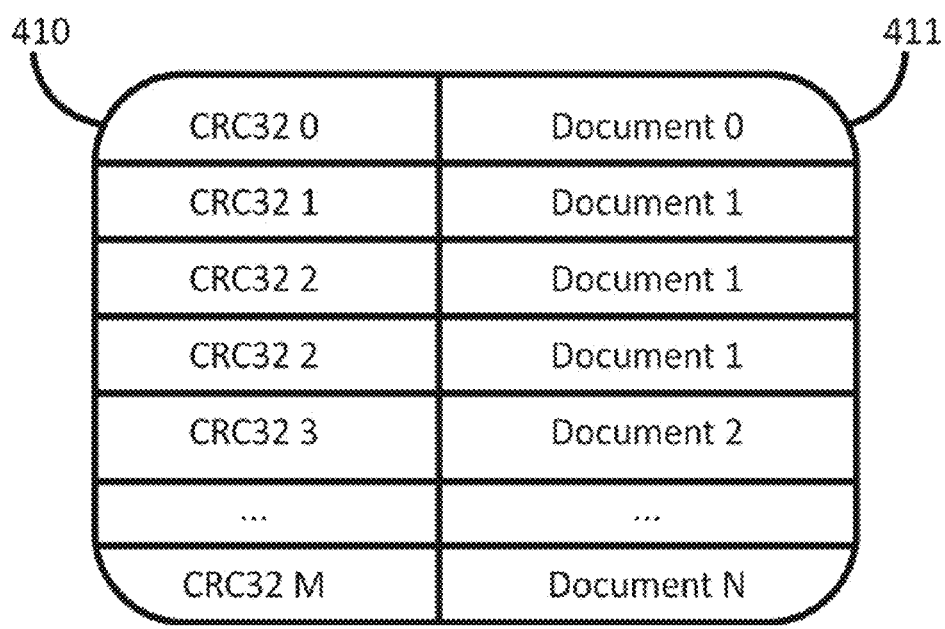
FIG. 4 refers to the database structure used to associate the CRC32 the protected documents.

The solution proposed by the present invention allows the user to generate an image of ETCODE for each page of the document or generate only one image to represent the whole document. Documents with an ETCODE image for each page have more than a CRC32 to identify them, where new CRC32 are generated for the new pages or changed pages. The relationship between the CRC32 and the document data base is represented by the table shown in FIG. 4, where 410 represents the code CRC32 and 411, the protected document.

After generation of the CRC32 appropriate starts, then the step of generating an image of ETCODE (312). The generation of the image of ETCODE is made from a steganography technique implemented by the present invention and is intended to hide the CRC32 code into a digital image.

Generation ETCODE Image:

Based on the technique developed by the present invention, it became possible to generate an image that can guarantee the authenticity and integrity of a protected document. This image should be printed with the document, which, if it is an improperly made copy, a hidden message will appear showing that the document is an unauthorized copy.

Figure 5:
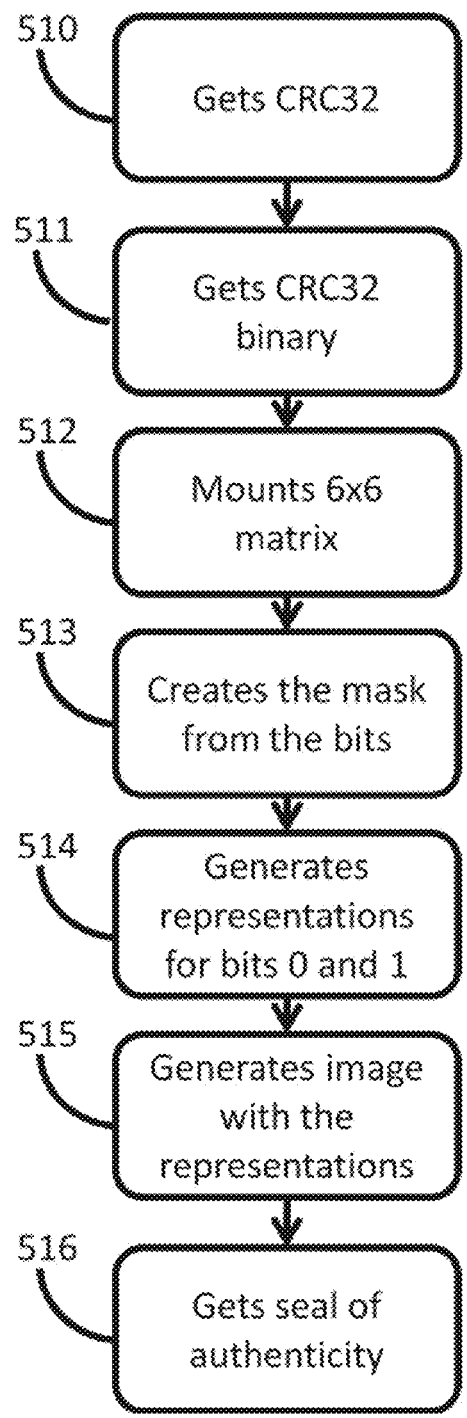
FIG. 5 depicts the flow executed for creating the image of ETCODE.

FIG. 5 shows the flow used to generate the image ETCODE. To generate the image ETCODE, obtains the CRC32 (510). The CRC32 uses 32 bits to store its value, and these are the bits that are used to create the image of ETCODE. Then, one obtains the value in binary CRC32 (511). It creates an image 36 (thirty-six) of the same blocks arranged in the form of a 6×6 matrix (512), where thirty and two blocks are used to store the code information CRC32, where each block is used to store one bit, and 4 (four) blocks store the seal of protection against unauthorized copying.

Figure 6:
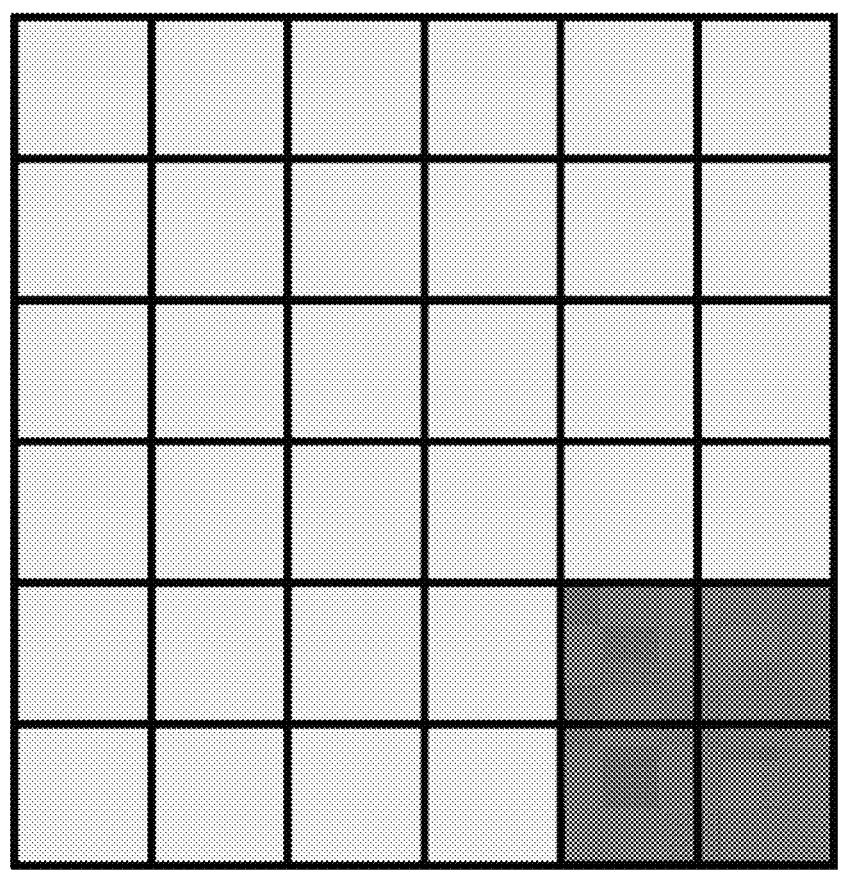
FIG. 6 shows the structure of the image ETCODE.

FIG. 6 shows a division used for creating the image of ETCODE, where the gray area (610) stores the bits of the CRC32 and the shaded region (611) corresponds to blocks of the seal of authenticity. The encoding of the CRC32 is made by examining the bits of the CRC32 and the construction of a matrix that stores this information. For this, it creates a mask in the form of matrix containing the arrangement of bits of the CRC32 (513). The size of this mask can vary and depend on the settings of the image of ETCODE to be generated.

Figure 7:
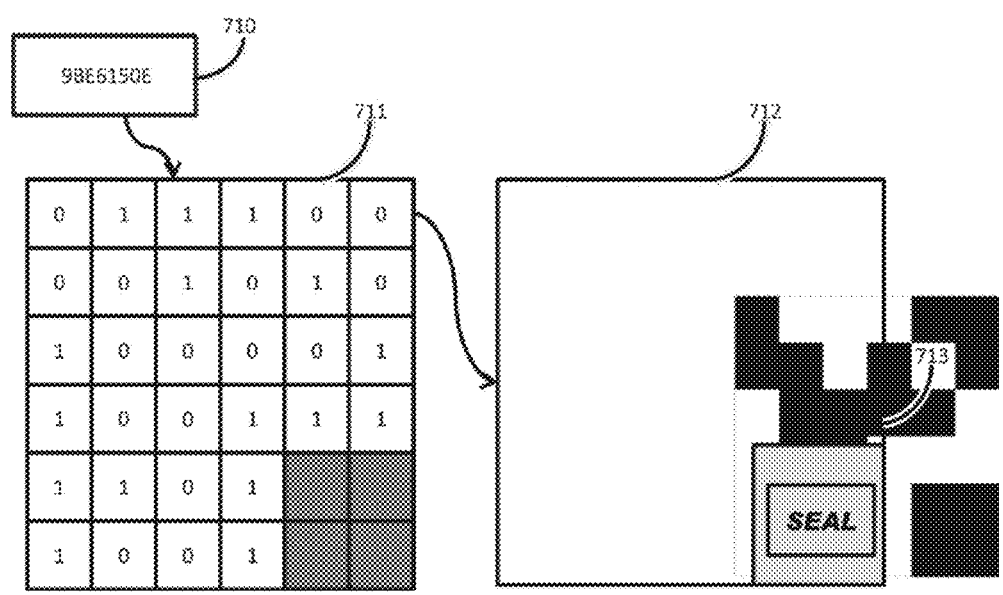
FIG. 7 shows the creation of the mask used in coding the bits of the image of ETCODE CRC32.

FIG. 7 shows the creation of this mask, where 710 shows an example of a CRC32 in hexadecimal code and 711 is presented in binary code positioned on the array. The bits are stored as shown by 711, of which bits are read from the lowest to the highest level, and stored from the first column and first row of the array, and the last two lines, they are stored until the fourth column of the matrix. The result is shown in the mask 712 and the mask is to be used in the composition of the bits are deleted in ETCODE image, and the blocks of the last two lines and the last two columns are used to store the sign-in seal (613) ETCODE the image.

The technique used for creating the image of ETCODE allows you to hide the bits in an image. For this, we created a representation for bit 0 and the other for a bit (514). From this representation, it became possible to distinguish the bit 0 of 1 bit using only the extraction process CRC32 code implemented by the present invention. This technique encodes information with random bit 0 and bit 1 has information with random dark spots overlapping with a fixed heel (eg, 4 pixels).

The encoding of bit 0 is accomplished by filling out an image the size of the image intensities ETCODE random between 0 and 230. Since the encoding of a bit is carried out similarly, but the intensity range between 0 and 255, and a value corresponding to the dark pixel is filled with a fixed heel, for example, every four pixels, the pixel overlap with the value of dark pixel. The value set for the dark pixel varies between 0 and 32 bits. The result will be two images, one for bit 0, with a random representation, and one for a bit, with the representation of quasi-random.

Figure 8:
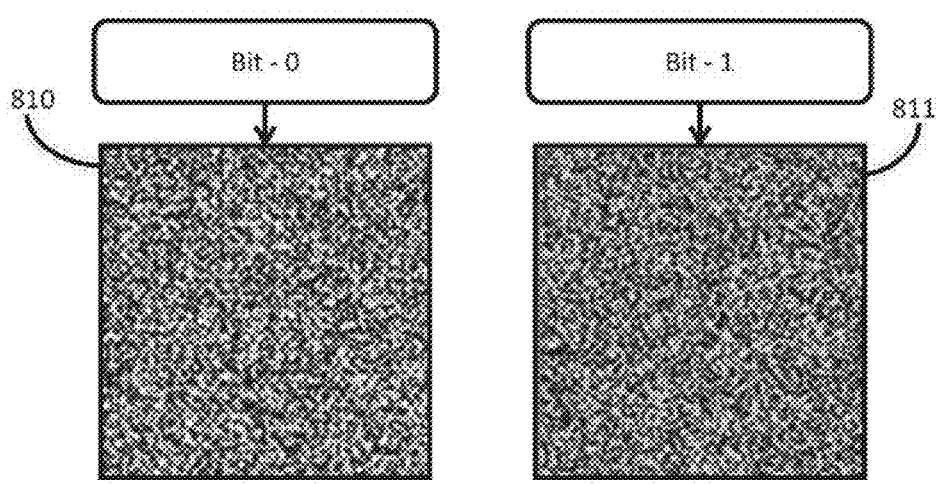
FIG. 8 illustrates the blocks with the representations of bit 0 and bit 1.

FIG. 8 shows ETCODE two blocks, one for bit 0 (810) and one for the first bit (811), and virtually unnoticeable to detect the difference between them to the naked eye. To generate the image of ETCODE, uses the mask of the bits to copy the information for each bit, creating an image with the representations of these bits (515). The representation of the bit 0 has value of 0 in the mask and the representation of the bit has a value of 255 in the shade. Paste is the block representation of the position of which is equal to the block position in the mask generating an image representations corresponding to the CRC32 obtained.

Figure 9:
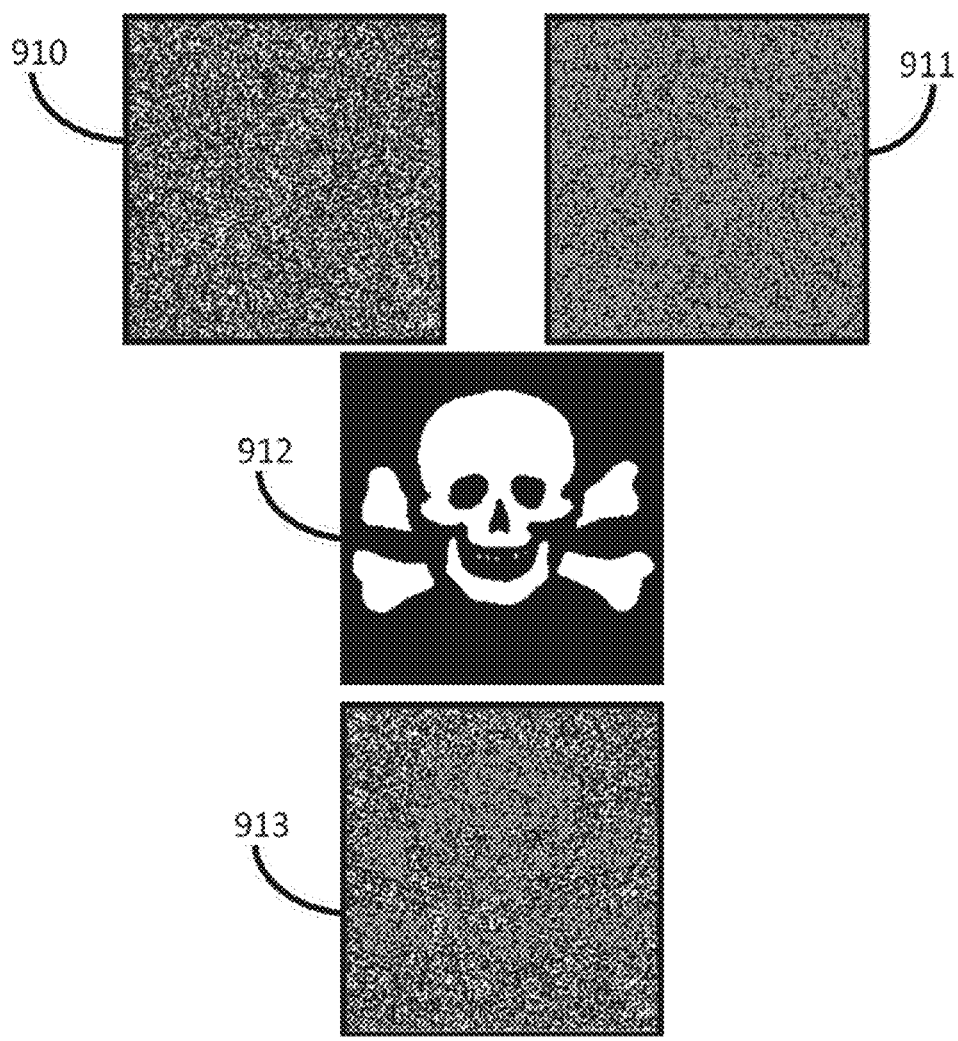
FIG. 9 shows the process to create the seal of authenticity.

Generation of the Seal of Authenticity:

After generating the image for the representation of bits is obtained, then the seal ETCODE the authenticity of the image (516). To generate the seal, it creates also two types of representations, one for the background and one for the foreground of the stamp of authenticity. This procedure is shown in FIG. 9. The representation of the background consists of random pixels with intensities varying between 0 and 255 (910). The first plane consists of a seal hatched area with some random dark pixels (911). A mask is used to define what is the background and foreground (912), where the pixels with intensities equal to 0 (zero) representing the background and the pixels equal to 255 (two hundred and fifty-five) represent the foreground of the stamp of authenticity. The final stamp of authenticity is presented in 913.

From the stamp of authenticity created by the process described above, one can identify whether the document is an unauthorized copy. Documents printed or photocopied, with different settings on the settings of the original document will not display the same pixel density of the original figure, which eliminates the hatched and, in turn, increases the sharpness of the foreground region of the seal of authenticity.

Figure 10:
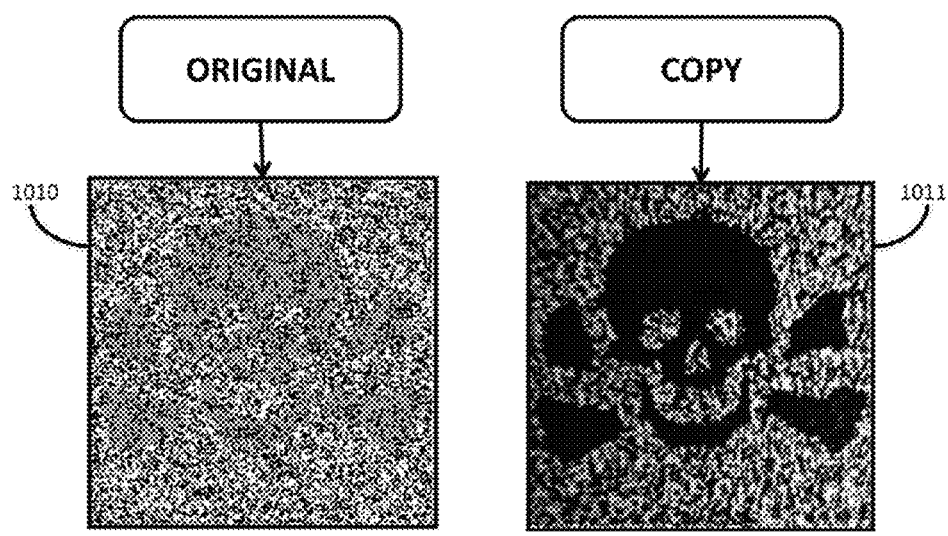
FIG. 10 illustrates the difference between the printed label of an original document and the seal of a copy.

FIG. 10 illustrates the difference between the original seal of authenticity (1010) and the result of copying with a different density or photocopy of the document (1011).

Figure 11:
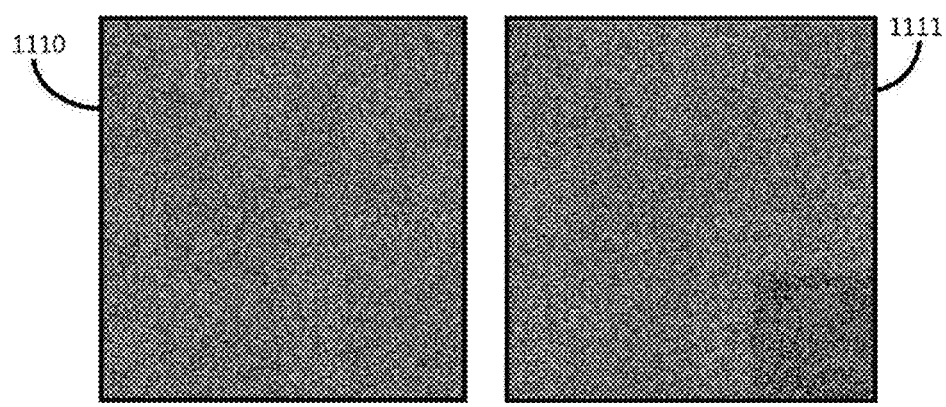
FIG. 11 shows the image resulting from process ETCODE developed by this patent.
Figure 12:
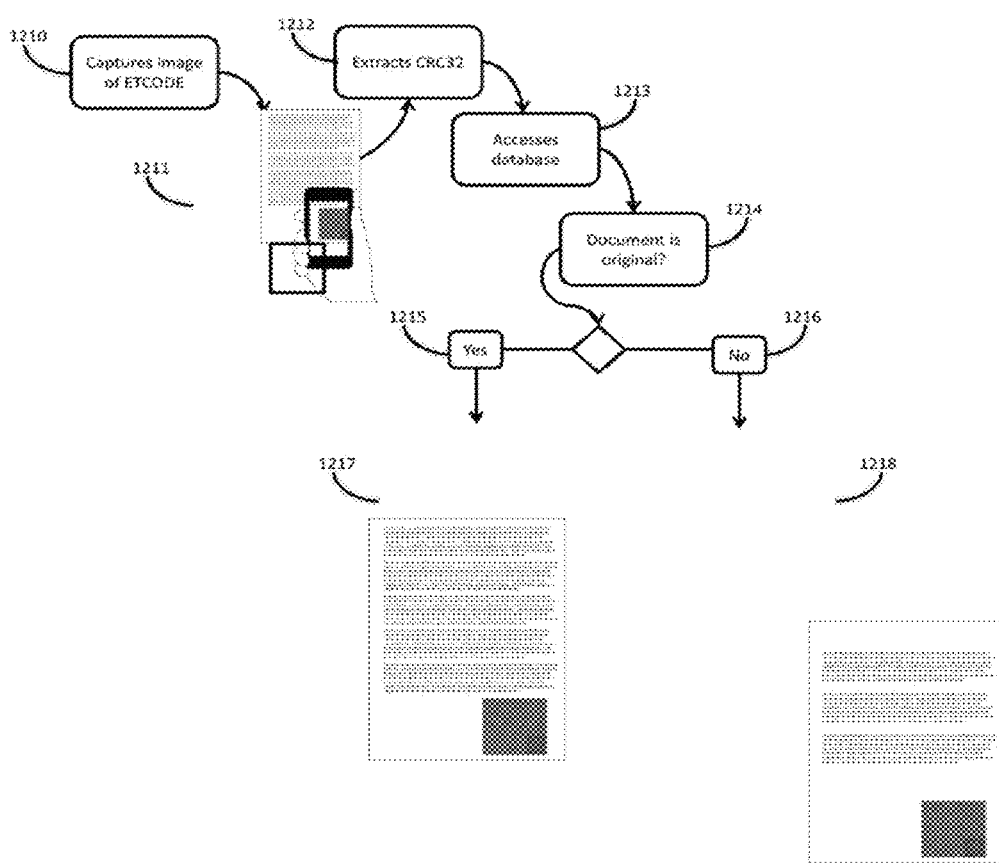
FIG. 12 illustrates the process executed to perform the verification and validation of the document.

FIG. 11 shows the result of the generation of ETCODE where 1110 does not have the stamp of authenticity and 1111 is a complete image of ETCODE already built with the authenticity seal.

After generating the ETCODE (313), this should be printed with the document (314). The printing of the document must be configured so that the print density is a resolution to avoid losing information, such as create or delete information in the image of ETCODE, which hinders the extraction of CRC32. The paper printed with the image of ETCODE (315) has its integrity and authenticity guaranteed, since through this is possible to identify the authorship of the document and see if it is original or an unauthorized copy.

The solution of the present invention allows users to extract information encoded by ETCODE using a portable device. This process corresponds to step "ETCODE extraction of information" (211).

Extraction of Information ETCODE (211):

To extract the information stored in the image of ETCODE, first, it is necessary to capture it from a portable device (1210). The user must fit the image of ETCODE associated with the document into the sights of the application (1211) and then perform image capture. After obtaining the image begins the method used to obtain the number of concealed in the image CRC32 ETCODE associated with the document (1212).

Figure 13:
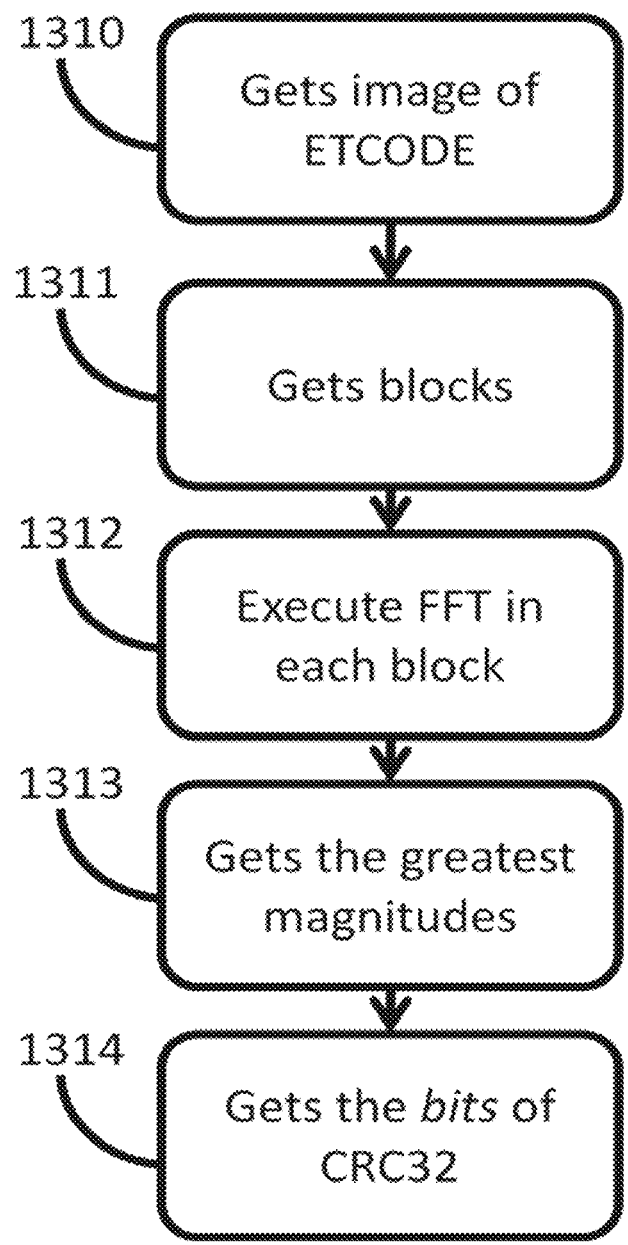
FIG. 13 shows the flow runs in the process of extracting the image CRC32 ETCODE.

FIG. 13 shows the flow used to extract the information concealed in the image ETCODE. To accomplish the extraction the CRC32 ETCODE code, one obtains a first image containing only the image of ETCODE (1310). Then dividing the image into blocks (1311), as illustrated in FIG. 6 and obtained by only the blocks that were hidden on the bits of the CRC32. These blocks are represented in 610. Each block will have obtained the pixels may be represented bit 0 or bit 1, where bit 0 is represented by a totally random pattern of the intensities of pixels and the one bit is represented by a quasi-random pattern of pixels. The captured image can contain the ETCODE different resolutions, and the intensities of the pixels can be changed and depend on the level of ambient lighting, and then need a method able to differentiate the block represented by bit 0 of the block represented a bit that is invariant and the resolution level of intensity of pixels.

The main difference between the representations of bit 0 and bit 1 is related to the fact that the representation of a bit having a uniform spacing of pixels with low tone (dark pixels). To form the bit 1, there is a dark pixel, by way of non-limitative example, every four (4) corresponding pixels in the block. Then, to define the difference between the representations of bit 0 and bit 1, it became necessary to obtain the spatial frequency or wavenumber of this block and thus can know whether the block in question has a dark pixel to each four (4) pixels. Therefore, the high-frequency block of dark pixels every four (4) consists of a pixel representation of one bit, otherwise the block is a representation of bit 0.

The method of the present invention performs the conversion of the image field of the space for the frequency domain from the discrete Fourier transform (1312), obtaining the transformed blocks. Equation (1) below is the discrete Fourier transform for two dimensions:

$$F(u, v) = \frac{1}{MN} \sum_{x=0}^{M-1} \sum_{y=0}^{N-1} f(x, y) \exp\left[-j2\pi\left(\frac{ux}{M} + \frac{vy}{N}\right)\right] \quad (1)$$

where u=(0, 1, 2, . . . , M−1) v=(0, 1, 2, . . . N−1).

The method of extracting CRC32 of the image of ETCODE uses the algorithm of fast Fourier transform (FFT) to compute the discrete Fourier transform, reducing the complexity in the worst case $O(N^2)$ to $O(n \log 2n)$ and in turn, reduces the computational cost in converting the focused block in the field of space for the frequency domain.

Figure 14:
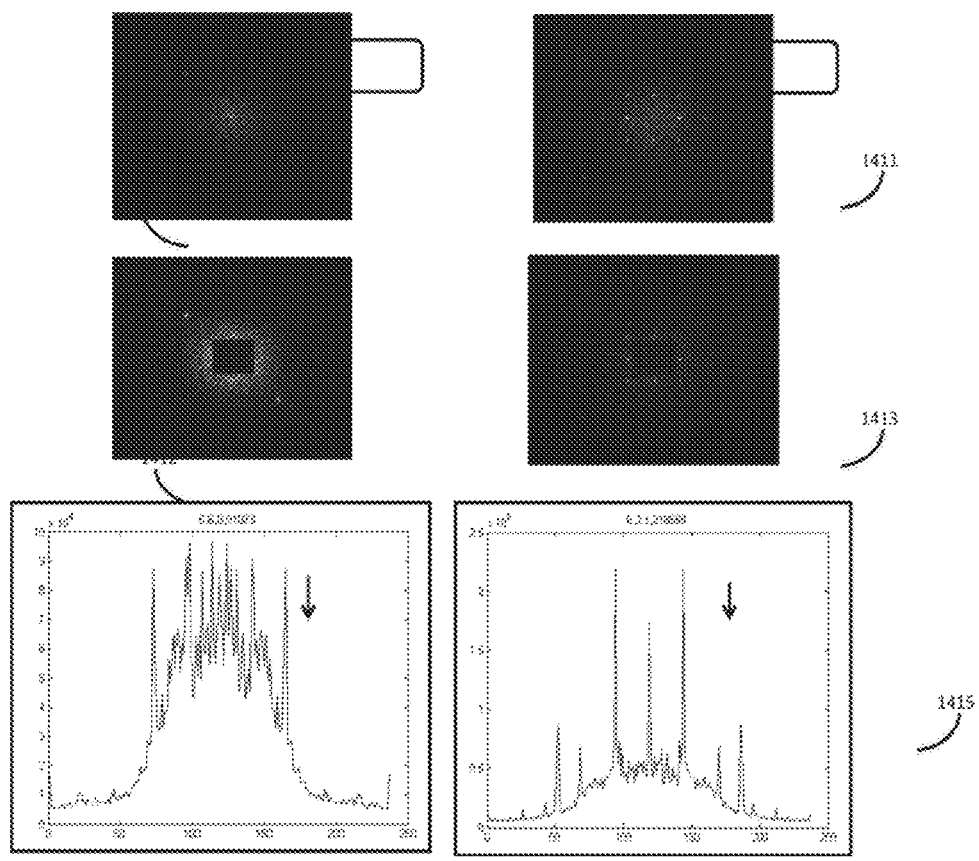
FIG. 14 shows the graphs and the transformed blocks with the representations of bit 0 and bit 1.

FIG. 14 shows the result of the discrete Fourier transform of a block with the representation of bit 0 (1410) and transform another block with the representation of a bit (1411), after performing the circular shift to reposition the center to the magnitudes the edges of the transform. From these processed, it becomes possible to differentiate the representations of the bit 0 of 1 bit, checking at certain frequencies the magnitude of the transform. For this, the magnitudes of lower frequency are eliminated by removing the central region of the processed, as shown at 1412 and 1413, and, in turn, increasing difference between the magnitudes of the processed.

Figure 15:
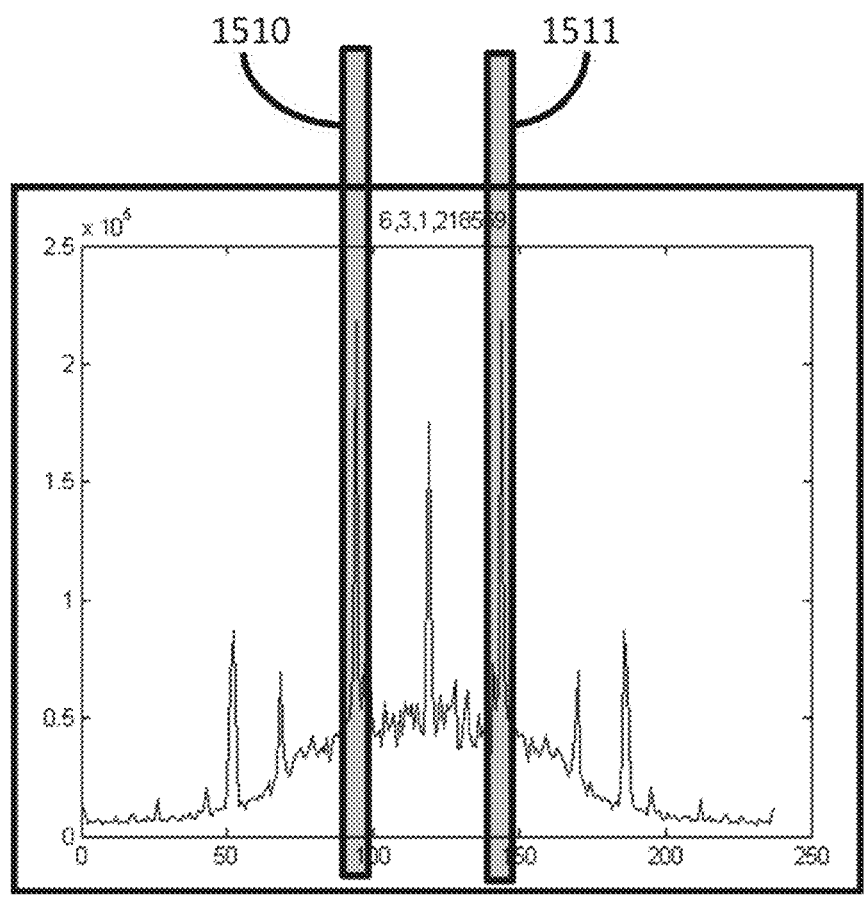
FIG. 15 illustrates a graph of the frequency range used in the differentiation of the blocks with the representations of bit 0 and bit 1.

From the graphs represented by 1414 and 1415, it was observed that a bit turned on certain frequencies constantly presented with high values of magnitudes. Therefore, we created a method that gets the largest magnitude of this frequency band (1313), as shown in FIG. 15), where, if the value returned is greater than a previously set threshold, then the block in question is a representation of a bit, otherwise this block is a representation of the bit 0. This procedure is performed for the blocks located in the region where the CRC32 bits are stored.

After obtaining the values of each bit stored in the image of ETCODE, they are read and stored in a 32-bit variable that represents the CRC32 (1314) corresponding to the document, in which the user wants to obtain or verify the authenticity of authorship.

With the CRC32 code in hand, is effected, then the verification and validation of the document by doing a query on a remote database (1213). This corresponds to the step "validation of the printed document" (212).

Figure 16:
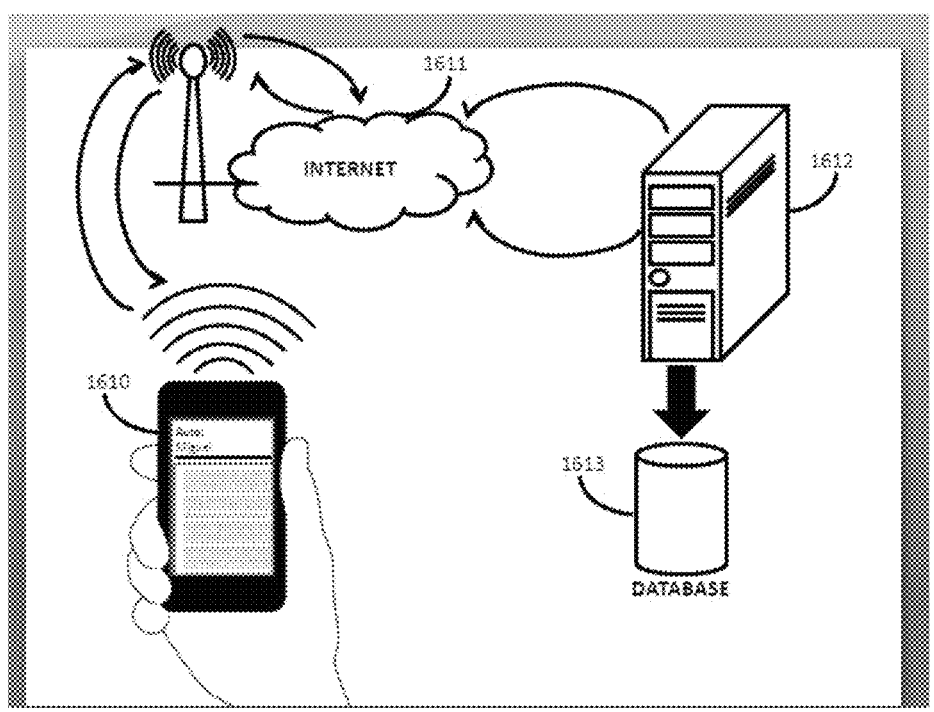
FIG. 16 shows the flow used to query information about the document printed from the CRC32 obtained.

Validation Document Printed:

FIG. 16 shows the procedure carries out the verification and validation of the document. Using a portable device (1610) is sent CRC32 code associated with the document to a remote server (1612) by requesting the server. The portable device with the system that performs validation and verification of the document must be connected to the Internet (1611) to perform communication with a remote server. This server stores the information of documents protected by the system designed by the method described herein.

The database (1613) is responsible for storing and retrieving data from the protected documents containing information about the document's author, the CRC32 codes associated with this document, among others. It is then sent to the portable device the document associated with the CRC32 used in the request, along with the author of this document.

From the author's name obtained by the request, it becomes possible to verify the author of the document. The digital document returned in the request is confronted with the printed document (1214) and it is verified that these are equal. In 1215, presents a case study, where the digital document returned (1217) is equal to the printed document. In 1216, returns to a digital document (1218) different from the printed document, showing that this does not match with the original.

Moreover, to ensure the authenticity of the document, the method described by this invention, according to a preferred embodiment, proposes a technique for encrypting the CRC32 document from a user-defined key of the application, in order to identify its authorship. This technique would use a simple encryption by applying XOR ("exclusive or") between the CRC32 and CRC32 key document.

Figure 17:
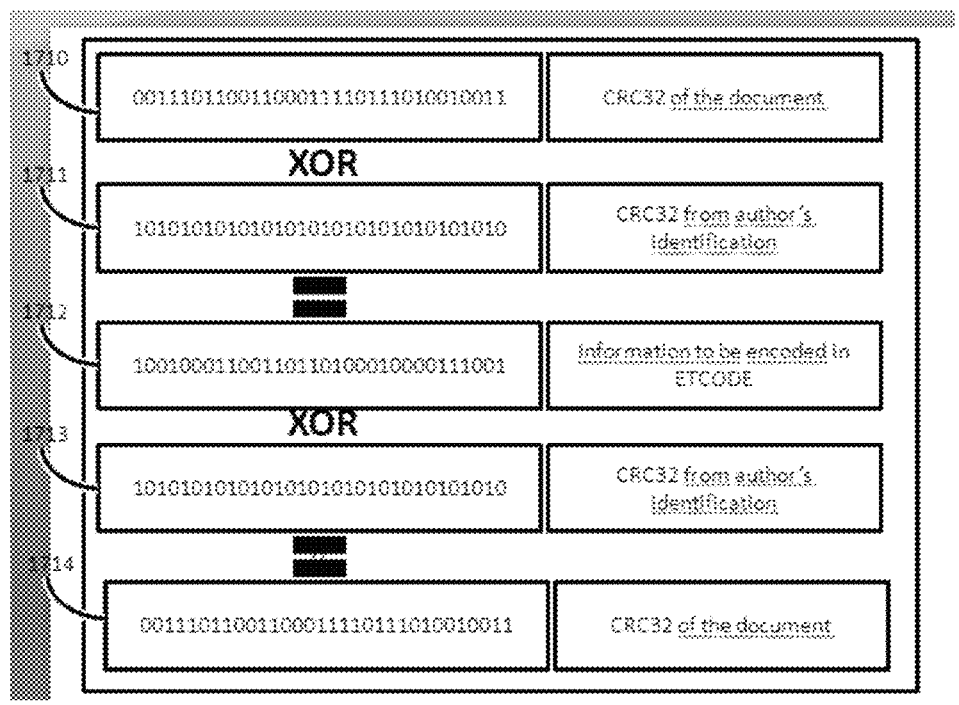
FIG. 17 illustrates an encryption process to ensure the authenticity of the document.

FIG. 17 shows how this procedure is performed. A simple encryption would use the CRC32 of the document (1710) and CRC32 created to identify the document's author (1711). It applies an XOR, obtaining, in turn, the new code (1712) which is encoded in image ETCODE. This code would be associated with the code's author in the database located on a remote server. At the moment the user performs the query to verify the authenticity of the document, the CRC32 of the author would be returned (1713) and, in turn, would effect the XOR between this and obtained CRC32 (1712), resulting in corresponding to CRC32 document (1714). The aim is, then the document associated with this CRC32.

Using the preferred embodiments of the present invention it became possible to create an efficient and effective able to guarantee the authenticity and integrity of printed documents using steganographic techniques.

Example 1

Figure 18:
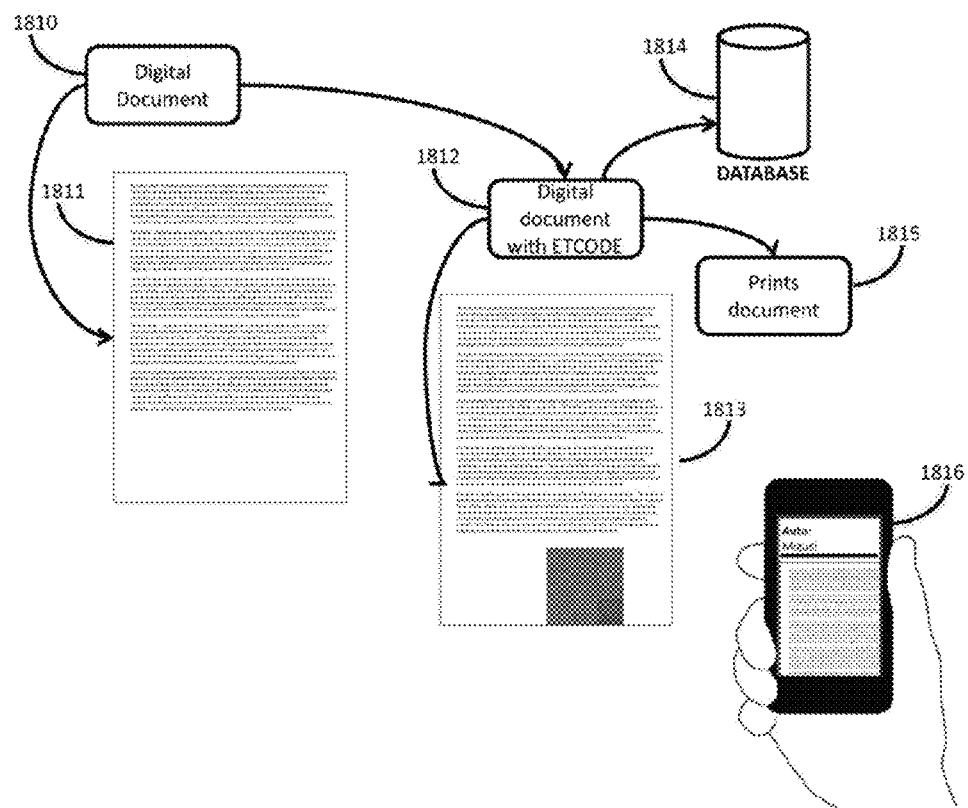
FIG. 18 illustrates the general flow to generate the image of ETCODE and perform verification and validation of the printed document.

The following is a sequence of steps illustrated using a possible embodiment of the present invention, without restricting sequences or other possible embodiments of using the process described in this specification. This process is illustrated in FIG. 18.

Create Document with ETCODEs Pages:

Initially, the user uses a PC's (Personal Computer) that generates digital images ETCODE protection for the document you want to protect. The proposed system can be run through a web browser and is used to insert and update data in a database located on a remote server. The document must be protected in a digital format, for example non-limiting, PDF (Portable Document Format) and is passed to the system generator ETCODEs (1810). Each of the digital pages of the document must have a margin on the bottom (1811) for the insertion of the image of ETCODE on it so that its inclusion will not affect the display of the initial content of this. The next step in this process is sequentially generate ETCODEs of each page of the original document and finally create and store a new digital document that differs from the original by having attached one on each page ETCODE (1812), illustrated in 1813.

Storing Document in the Database:

Both pages of the document as their respective CRC32 are stored in a database located in remote served (1814).

Printing a Document:

It effects then the printing of the document generated in the process described so far, which contains the ETCODEs in each page (1815).

Verification of Authenticity of the Document:

Later, if the user wishes to verify the authenticity of a printed document that reaches it in print, we use a handheld device to capture an image of ETCODE attached to it (1816). This image is decoded to extract the CRC32 on the document, which allows comparison of the printed document with its digital version in order to validate its integrity. The unauthorized copies (photocopies "Xerox") does not faithfully reproduce the image of the region intended for validation against ETCODE copies, making it possible to differentiate between original documents from unauthorized copying.

The system of the present invention is to be used by users who wish to protect digital documents and verify the authenticity of printed documents. In summary, the proposed system allows the user to generate an image ETCODE to protect each of the pages that form the paper and then use portable devices to decode these ETCODEs. The use of ETCODE allows to perform the validation of integrity and authorship, as well as possible protection against unauthorized copying. Thus, we obtained an integrated, embodied in hardware and software that enables protection against unauthorized copying and verification of integrity and authorship of the printed document.

Although a preferred embodiment of the present invention is shown and described, those skilled in the art understand that various modifications can be made without departing from the scope and spirit of the present invention as defined in the appended claims.

It is explicitly mentioned that also all combinations of elements that perform the same function in substantially the same way to achieve the same results are within the scope of the invention.

The invention claimed is:

1. A system for digital analysis, using a handheld device, of authenticity and integrity of a document, the system comprising:
    a central processing unit (CPU) to execute instructions needed for encoding and decoding information, including a CRC32 code generated from content of the document, hidden in an Entropy Tag Code (ETCODE) image to be printed with the document, so that a message, previously hidden, will appear in a copy of the document, indicating the document is an unauthorized copy;
    a digital camera to capture the ETCODE image;
    a storage unit for storing information associated with the document;
    an information input unit to intercept user input events;
    a connectivity component that allows the user to connect to a remote database that has information for the ETCODE image and the document corresponding to the ETCODE image, and
    a display for displaying the ETCODE image,
    wherein the ETCODE image includes blocks, wherein each block comprises pixels that can represent the bit 0 or bit 1, where bit 0 is represented by a totally random pattern of the pixels and bit 1 is represented by a quasi-random pattern of the pixels.

2. The system of claim 1, further comprising a web browser to insert and update the information for the ETCODE image in the database located on the remote server.

3. The system of claim 1, wherein the document is in a digital format.

4. The system of claim 3, wherein the digital format is Portable Document Format (PDF).

5. The system of claim 3, wherein each page of the digital document has an edge at a bottom to insert the ETCODE image so the insertion will not affect the display of an initial content of the document.

6. A method for digital analysis of authenticity and integrity of a document using a portable device, the method comprising:
    generating an ETCODE image, including a CRC32 code generated from content of the document, associated with the document to be printed with the document, so that a message, previously hidden, will appear in a copy of the document, indicating the document is an unauthorized copy;
    extracting information from the ETCODE image by capturing the ETCODE image using the portable device; and validating the printed document, by the portable device, using the CRC32 code by querying a remote database, wherein the ETCODE image includes blocks, wherein each block comprises pixels that can represent the bit 0 or bit 1, where bit 0 is represented by a totally random pattern of the pixels and bit 1 is represented by a quasi-random pattern of the pixels.

7. The method of claim 6, wherein the CRC32 code is used to identify the document or a portion thereof, and the document and respective CRC32 code are stored in the database, which correlates the document or portion thereof and the CRC32 code.

8. The method of claim 6, wherein the CRC32 code is generated from the document.

9. The method of claim 6, wherein an ETCODE image is generated for each page of the document and only one image is generated to represent the entire document.

10. The method of claim 6, wherein the CRC32 code is hidden in the ETCODE image.

11. The method of claim 6, wherein the CRC32 code is encrypted from a key defined by a user in order to identify inventorship, wherein the encryption is performed by applying XOR logic between the CRC32 code and the key.

12. The method of claim 6, wherein the document is in a digital format.

13. The method of claim 12, wherein the digital format is Portable Document Format (PDF).

14. The method of claim 6, wherein each page of the document has an edge at a bottom to insert the ETCODE image so the insertion will not affect the display of an initial content of the document.

15. The method of claim 6, wherein the ETCODE image contains different resolutions, and the intensities of pixels depend on the level of ambient light.

16. The method of claim 6, wherein the values of each bit stored in the ETCODE image are read and stored in a 32-bit variable representing the CRC32 code.

17. A method for digital analysis of authenticity and integrity of a document using a portable device, the method comprising:

generating an ETCODE image associated with the document to be printed with the document, where, if an unauthorized copy is made, a hidden message will appear indicating the document is an unauthorized copy;

extracting information from the ETCODE image by capturing the ETCODE image using the portable device; and validating the printed document, by the portable device, using a CRC32 code by querying a remote database, wherein, extracting the CRC32 code comprises:

obtaining the ETCODE image; and dividing the image into blocks, wherein each block comprises pixels that can represent the bit 0 or bit 1, where bit 0 is represented by a totally random pattern of the pixels and bit 1 is represented by a quasi-random pattern of the pixels.

* * * * *

UNITED STATES PATENT AND TRADEMARK OFFICE
CERTIFICATE OF CORRECTION

PATENT NO.       : 9,591,173 B2
APPLICATION NO.  : 13/339014
DATED            : March 7, 2017
INVENTOR(S)      : Eduardo Telmo Fonseca Santos et al.

It is certified that error appears in the above-identified patent and that said Letters Patent is hereby corrected as shown below:

On the Title Page

First Column, (75) Inventors:
Delete "Salvador-Ba (FR)" and insert --Salvador-Ba (BR)--, therefor First Column, (73) Assignee, Line 1:
Delete "ELECTRÔNICA" and insert --ELETRÔNICA--, therefor Signed and Sealed this
Eleventh Day of July, 2017

Joseph Matal
*Performing the Functions and Duties of the*
*Under Secretary of Commerce for Intellectual Property and*
*Director of the United States Patent and Trademark Office*